United States Patent [19]
Chance et al.

[11] 3,784,238
[45] Jan. 8, 1974

[54] INTERMEDIATE DRILL STEM

[75] Inventors: Glenn G. Chance; Sam T. Crews, both of Houston; Clenis E. Wilson, Spring, all of Tex.

[73] Assignee: Smith International, Inc., Midland, Pa.

[22] Filed: May 17, 1971

[21] Appl. No.: 143,953

[52] U.S. Cl.................. 285/286, 308/4, 285/333
[51] Int. Cl............................................. F16l 13/02
[58] Field of Search....................... 285/21, 22, 333, 285/334, 286, 45; 64/1; 308/4, 4 A; 175/325

[56] References Cited
UNITED STATES PATENTS

| | | | |
|---|---|---|---|
| 3,080,179 | 3/1963 | Huntsinger...................... | 285/333 X |
| 2,259,232 | 10/1941 | Stone.............................. | 285/334 X |
| 3,193,918 | 7/1965 | Heldenbrand.................... | 308/4 |
| 2,073,093 | 3/1937 | Brantly........................... | 285/286 X |
| 2,301,495 | 11/1942 | Abegg............................. | 285/333 X |
| 3,152,458 | 10/1964 | Simonin........................... | 64/1 |

*Primary Examiner*—Dave W. Arola

[57] ABSTRACT

Intermediate drill stem includes an alloy steel body of smaller inner diameter than usual for drill pipe machined to drill pipe outer diameter except having one or more integral protectors of larger outer diameter at intervals along its length and except further having integral transition portions of somewhat larger than drill pipe outer diameter near its ends and portions of elevator shoulders at the ends, the ends also being built up externally and internally with weld metal to match the wall thickness of extra long alloy steel connector members rod welded to the ends of the body. Typically the body of the intermediate drill stem is made from a worn out drill collar and if the ends of the collar are not too far gone the original integral drill collar connectors can be used. New material may be used for the body and if anticipated loading is not too great carbon steel could be used instead of alloy steel. In any case, the integral protectors could be omitted.

25 Claims, 7 Drawing Figures

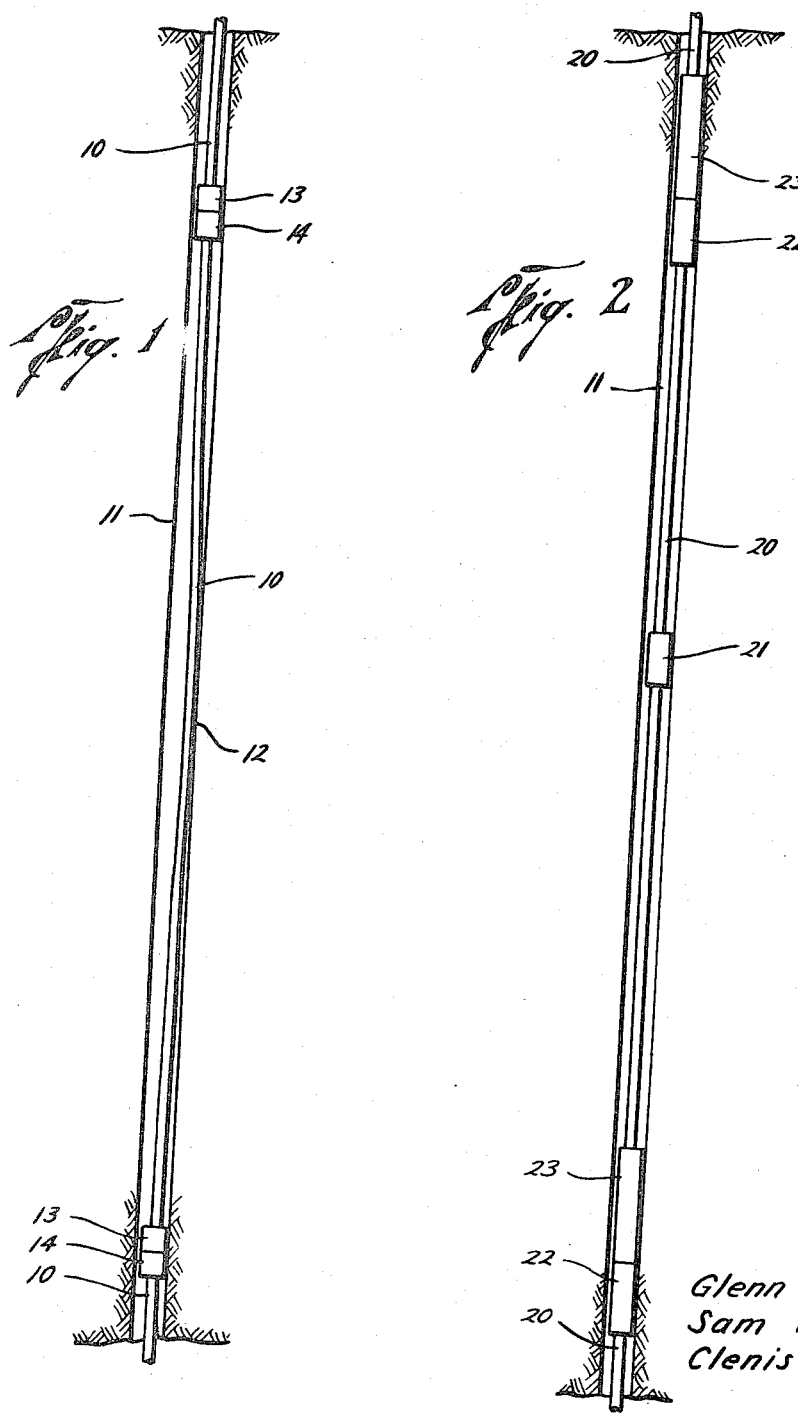

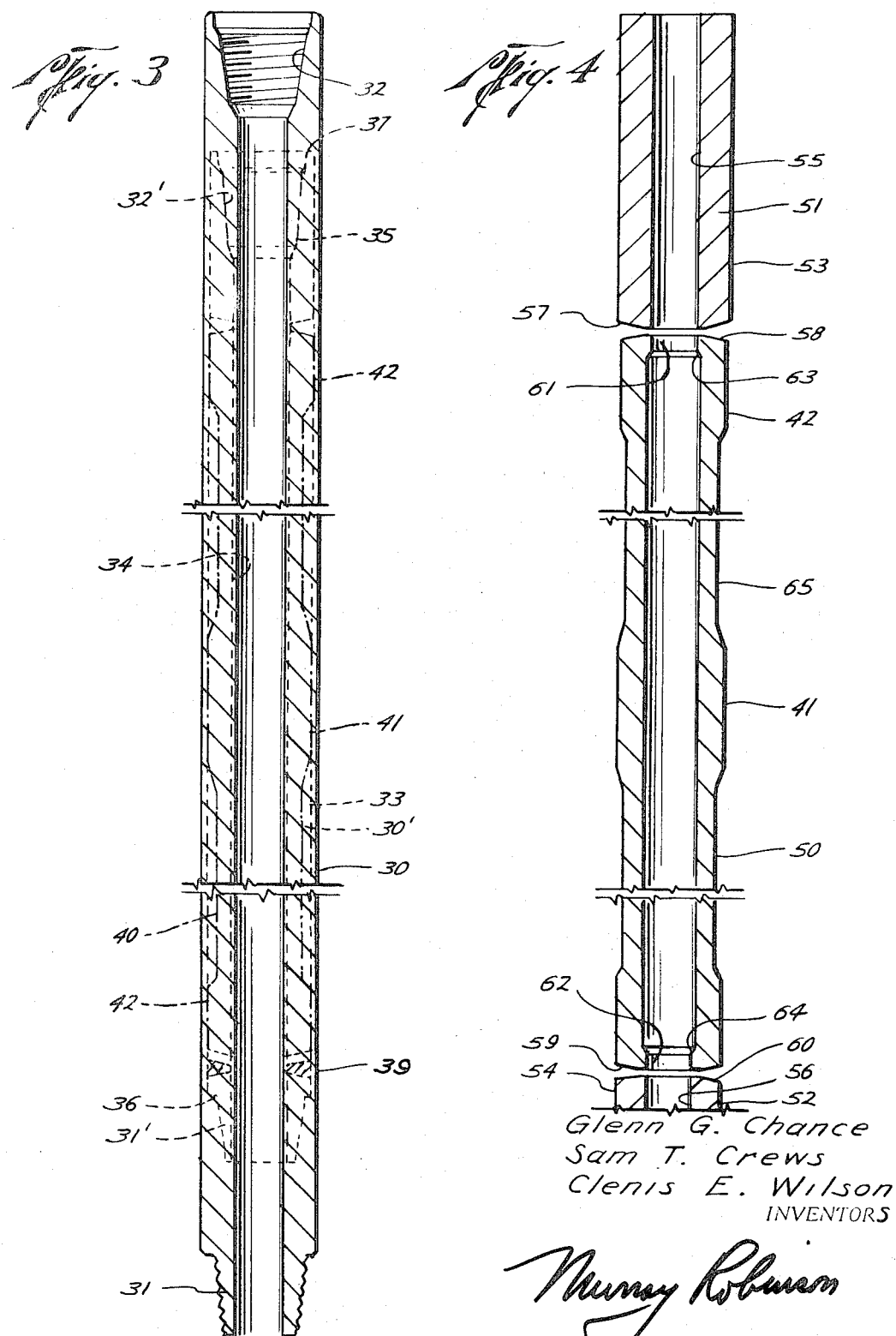

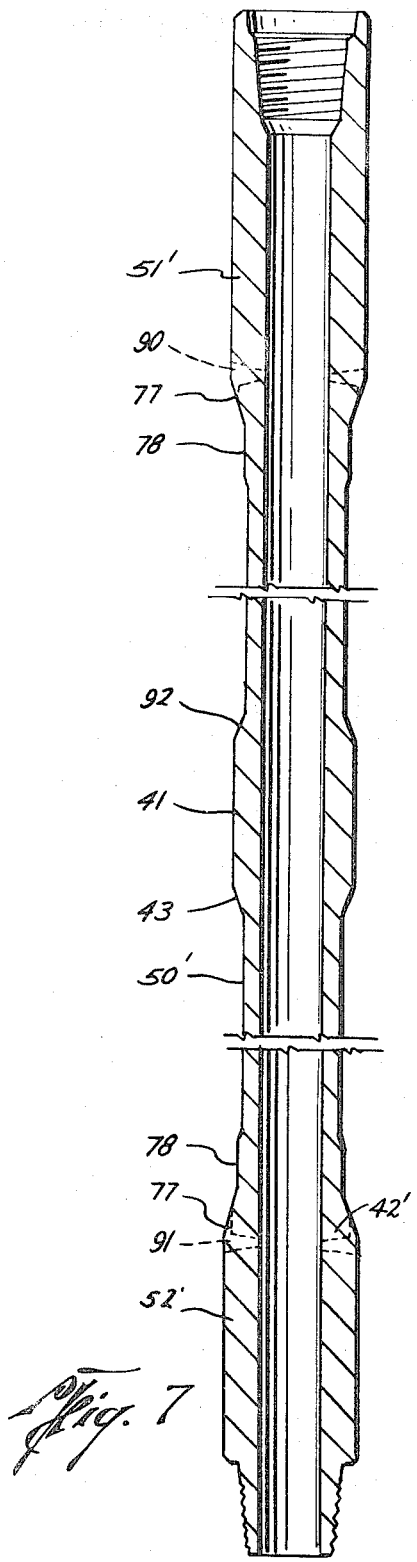
Fig. 5
Fig. 7
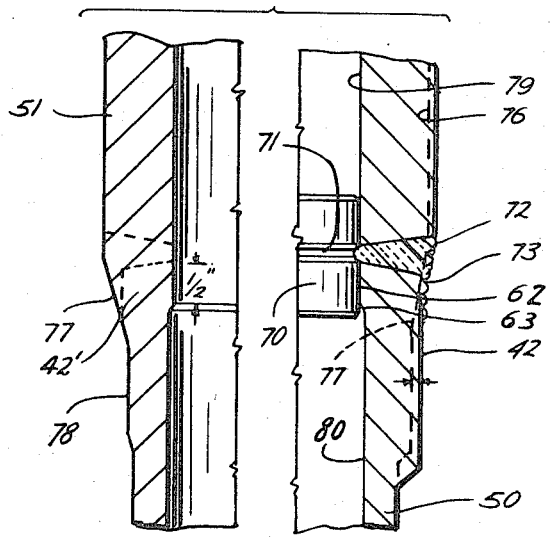
| BASED ON 30' 6" FINISHED LENGTH | | |
|---|---|---|
| L | * BOX END LENGTH OF STUB | * PIN END LENGTH OF STUB |
| 25' 0" | 2' 0" | 3' 6" |
| 25' 6" | 2' 0" | 3' 0" |
| 26' 0" | 2' 0" | 2' 6" |
| 26' 6" | 2' 0" | 2' 0" |
| 27' 0" | 1' 6" | 2' 0" |
| 27' 6" | 1' 6" | 1' 6" |
| 27' 9" | 1' 3" | 1' 6" |
*MAT'L NOTE: AISI4145H, H.T. 277-331 BHN.
6 1/2 O.D. × 2 13/16 I.D.
Fig. 6
Glenn G. Chance
Sam T. Crews
Clenis E. Wilson
INVENTORS
Murray Robinson
ATTORNEY

INTERMEDIATE DRILL STEM

BACKGROUND OF THE INVENTION a. Field of the Invention

The invention pertains to intermediate drill stem placed between the drill collars and drill pipe of a drill string used in the rotary system of drilling holes in the earth, e.g. oil wells. Intermediate drill stem provides a gradual transitiion between the rigid drill collar part of the drill string and the flexible drill pipe part of the drill string. Intermediate stem resembles drill pipe in that the outer diameter is the same as that of drill pipe so as to fit drill pipe elevators, and the polar moment of inertia of the cross-sectional area of the connectors is larger than that of the body, so that the connections are more rigid than the body and most of the flexing takes place in the body and the connections need not be made up as tight as for drill collars to prevent the shoulder seal from opening up under load. On the other hand intermediate stem resembles drill collars in that it is run in compression to put weight on the drill bit and the inner diameter is close to that of drill collars, providing a thick wall for weight, wear and strength. Body rigidity of intermediate stem is intermediate that of drill pipe and drill collars.

B. Description of the Prior Art

Prior workers in the art have tried out intermediate stem made by flash welding the necked down ends of conventional drill pipe tool joints to a body made of heavy wall pipe. In this construction the body was not machined from drill collar stock and did not include any protector to prevent wear of the body caused by flexure into contact with the side of the earth bore. The tool joint connectors were of conventional length and not adapted for remachining when worn, it being contemplated that the body would wear out before the tool joints. Only a small number of lengths of such intermediate stem could be used due to the excessive wear on the lowermost lengths where the compression loading and flexure are greatest.

SUMMARY OF THE INVENTION

The principal object of the invention is to provide an intermediate drill stem that has a longer life than previously known intermediate drill stem. This is accomplished by the provision of an alloy steel body with one or more protectors integrally formed along its length and with the connectors at each end, especially the pin end, having great length.

The protectors intermediate the connectors and the connectors both keep the body of the intermediate stem out of contact with the well wall immediately adjacent to the connectors and the protectors, thereby reducing waer on the body. The protectors and connectors both act as centralizers so that by use of protectors the laterally unsupported body length between centralizers is reduced. The reduction may be to the point where the product of the unsupported body length and the bending deflection per unit length under expected lood will be less than the difference between hole radius and body radius, thereby keeping the body out of contact with the well wall throughout its full length. Under ordinary conditions one protector per usual thirty foot length of intermediate stem accomplishes this result.

The use of extra long connectors aids in accomplishing the foregoing result since they reduce the degree to which the connectors can cant in the hole. A connection made up of pin and box connectors having a combined length (of maximum diameter portion) less than the hole diameter can cant in the hole to an extent limited only by the pipe connected thereto. Connector diameter is usually about 80 percent of hole diameter so that to prevent such unlimited canting, the overall connection length must be at least about 125 percent of the connector outer diameter. However, to effectively limit canting and keep the connection axis nearly parallel to or in alignment with the hole axis, the overall length of the maximum diameter portion should be much greater. According to the preferred embodiment of the invention the overall pin and box connection length is from about 400 percent to 1,000 percent of the outer diameter of the connectors.

As a result of the use of protectors and long connectors, the body may be kept substantially out of contact with the well wall, thereby greatly increasing the life of the body. The use of high strength alloy steel for the body keeps the bending stresses well below the yield strength of the body so that the number of cycles of flexure permissible prior to fatigue failure approaches infinity. To balance the connector life with the long life of the body, the extra length of the connectors allows for remachining of the threads.

A further object of the invention is to provide an inexpensive intermediate drill stem of the aforementioned type. To this end a worn out drill collar may be used for the body of the intermediate stem and the connector members made of new drill collar stock, welded to the body. The elevator shoulder is formed on the body rather than the connector, so that the weld can be made between connector and body ends of maximum thickness, thereby permitting the use of rod or bead type welding and eliminating the need for expensive flash welding equipment. The inner surface of the body ends is built up with weld metal to the same diameter as the connector prior to being welded thereto.

In the process of welding the connector to the body, weld metal is built up on the outside of the end of the body so that it is at least as large as the connector. The elevator shoulder is formed at the built up end of the body of the intermediate stem. Adjacent the elevator shoulder the body is provided with a transition portion of somewhat larger outer diameter than the main part of the body so that there will be a gradual transition in rigidity between the connectors and the main part of the body to prevent stress concentration at the weld. The connectors welded to the ends of the body are long enough so that when added to the length of the worn out drill collar the resulting intermediate stem is long enough to stand in the usual racks and to reach up to the platform for workers in the top of the drill rig, with enough length to spare so that the connectors can be cut back and remachined when worn down.

It is important to note that the body of the intermediate stem is machined, whereby the protectors are formed integral with the body without welding or upsetting, for any welding or upsetting, especially in an alloy steel body, can cause physical changes that alter the material whereby the intermediate stem might fail in use.

BRIEF DESCRIPTION OF THE DRAWING

FIGS. 1, 2 and 2A are schematic fragmentary sectional views each showing intermediate stem in use in a well bore, FIG. 1 showing the prior art type of intermediate stem and FIG. 2 showing intermediate stem embodying the present invention;

FIG. 3 is an axial section through a new drill collar showing in short-dashed lines the outline of a worn-out, stubbed drill collar and in heavy-dashed lines the outline of the body blank of an intermediate stem in accordance with the invention;

FIG. 4 is an axial section through the component machined body, and blank connector portions of the intermediate stem of FIG. 2 prior to welding together and machining of the connectors;

FIG. 5 is a schedule of typical dimensions and material specifications;

FIG. 6 is a composite enlarged fragmentary sectional view of the junction of the body and a connector blank showing in the right hand part of the figure the body and blank after welding together and with the weld supporting ring still in place prior to machining, the finished outer diameter being indicated in dotted lines, the left-hand part of the figure showing the finished juncture; and FIG. 7 is an axial section through a finished intermediate drill stem embodying the invention.

DESCRIPTION OF PREFERRED EMBODIMENTS

Referring now to FIG. 1 there is shown a portion of a drill string, including several lengths 10 of intermediate drill stem. Due to the compressive loading of the intermediate stem and the long unsupported length of the body it has deflected into contact with the low side of the well bore 11 at point 12. The tool joints 13, 14, are also in contact with the well bore. The contact of the wall and stem body at point 12 causes excessive wear on the body which results in its early failure. It is not necessary for the body to wear completely through to fail, for due to the compressive loading of the wall of the pipe may buckle. The contact of the tool joints 13, 14 with the well wall will cause wear of the boxes 14 which ultimately will result in failure of the tool joints.

Referring now to FIG. 2, there is shown a portion of a drill string including several lengths 20 of intermediate drill stem embodying the invention. Due to compressive loading of the intermediate stem it has flexed placing the protectors 21 in contact with the side of the well bore 11. The connectors 22, 23 are also in contact with the well bore. The protectors 21 prevent wear on the smaller diameter portions of the intermediate stem. The high strength of the alloy steel body of the stem provides a low stress ratio to resist fatigue. The long connectors 22, 23 reduce canting, resist wear, and provide length for remachining of the threads as may be required due to the extra life of the stem.

Referring now to FIG. 3, there is shown a new alloy steel drill collar 30 having a uniform outer diameter from end to end except for a threaded connector pin 31 formed at one end. The inner diameter of the drill collar is uniform from end to end except for a threaded connector box 32 formed at the end opposite from the end at which the pin 31 is formed.

The dotted line outline in FIG. 3 shows the dimensions of the same drill collar after it is worn out. The outer periphery 33 has worn down considerably and the inner periphery 34 is worn to a slightly larger diameter than on the new collar. The box end of the drill collar has several times been cut back and rethreaded at 32' so that the length of the drill collar has been reduced. The pin end of the drill collar has several times been cut back and remachined and finally a connector stub 31' has been welded on at 39 and it too has several times been cut back and remachined so that the length of the drill collar has reduced at the pin end too. Although the pin end of the collar could be restubbed, the box at the other end has such a thin wall that the connection would no longer be strong enough, being likely to fail at the bottom 35 of the box. Also, the pin shoulder 36 and box end face 37 are so small that the metal is apt to yield in compression if the pin and box are stressed enough in make up to prevent the pin shoulder to box end face contact area from opening up when the connection is subjected to bending moment. The connection is thus likely to leak and fail through a washout. If the box end of the drill collar were stubbed, the large outer diameter of the stub would soon wear down to the same diameter as the rest of the drill collar; also, stubbing both ends would cost about the same as machining a new drill collar. In short, the drill collar 30' is worn out. Because it is made of alloy steel it is not even useful as structural steel since it must be perheated if it is to be welded successfully.

The heavy-dash outline in FIG. 3 shows the outline of the body blank of a length of intermediate stem. The outer periphery 40 has been machined down to drill pipe outer diameter, except at 41 which is left at the diameter 33 of the worn drill collar, thus forming an integral protector for the intermediate stem, and except further at the ends 42. To complete the intermediate stem the connectors 31', 32' are cut off and new alloy steel connectors the same size as connectors 31, 32 are welded to the ends 42.

Referring to FIG. 4 there are shown the body blank 50 of the intermediate stem machined from the worn drill collar 30, and connector blanks 51, 52 to be welded thereto. The outer peripheries 53, 54 of the connector blanks are of full new drill collar diameter. The inner surfaces 55, 56 of the connector blanks are of the same inner diameters as a new drill collar. The ends of the body blank 50 and the adjacent ends of the connector blanks are beveled slightly as shown at 57, 58, 59, 60 to facilitate welding. The ends of the main body blank 50 are built up interiorly with weld metal at 61, 62 to the same inner diameter as the connector blanks and machined smooth. The juncture of the weld metal 61, 62 with the main body is tapered at 63, 64 (see also FIG. 5).

The lengths of the blanks 51, 52 are chosen so that together with the body 50 taken from a worn drill collar the total length of the intermediate stem will be of the desired amount, e.g. 30 to 31 feet, the same as the length of a new drill collar or drill pipe or intermediate drill stem. The minimum length of the box connector blank is preferably 15 inches for a 6½ inch O.D. connector; the minimum length of the pin connector blank for the same O.D. is preferably 18 inches, the extra three inches allowing for cutting a new pin after the intermediate stem has been in use so long that the original pin has worn out, while still leaving about a foot of full diameter connector material. For example, assuming a length of 4½ inch for the threaded portion of the pin, as is conventional for a six and one-half inch O.D. connector, the eighteen inch blank length provides for thirteen and one-half inches of maximum outer diameter portion. For 6½ inch O.D. connectors, the minimum ratio of length to diameter of the maximum outer diameter portion of the connectors is therefore 12/6.5 or 1.85 for the pin and 15/6.5 or 2.3 for the box. The minimum length of the maximum outer diameter of the combined pin and box connectors is thus about four (1.85 plus 2.3 equals times ther outer diameter of the connectors, as compared to a ratio of about three to one for a conventional tool joint connection. The maximum angle of cant is thus only 75 percent of that of an ordinary tool joint in an uncased hole.

For shorter lengths of body 50, the lengths of the connectors will be increased, preferably as shown in the FIG. 5 chart, the lengths being chosen so that there will be a relatively small number of different sizes of connectors blanks to handle the full range of body lengths. The maximum box connector should not exceed about two feet in length (an L/D ratio of 3.69 for a 6½ inch O.D. connector because otherwise the pin tongs would be too high to be handled from the rig floor when the pipe joints are added or removed from the drill string. Therefore for the more common 25 foot body lengths resulting from fully worn out drill collars, the pin connector is three and one-half feet long compared to only two feet for the box connector blank. A characteristic feature of the preferred embodiment of the invention is thus a connector pin of great length, for example the length of the maximum outer diameter portion of the pin ranging approximately from 2 to 7 times the diameter of the connector. The lower limit of approximately 2 is derived from the one foot minimum length of maximum outer diameter portion of the pin and a 6½ inch O.D. connector as discussed previously (12 inch/6½ inch = 1.85). The upper limit of approximately 7 corresponds to a pin having a length of maximum outer diameter portion of (6½ inch)×(7) or 45½ inch. Adding 4½ inch for the threaded portion of the pin gives an overall pin length of 50 inches or 4.2 feet. This is considerably longer than the greatest pin length of 3½ inch specified in FIG. 5, such a pin length corresponding to an L/D ratio of only (42 inch-4.5 ft.)/6.5 which equals 5.8.

From the pin max. O.D. length/diameter range of 1.85 to 7 and the box length/diameter range of 2.3 to 3.69, the range for the ratio of length to diameter of the maximum outer diameter portion of the combined pin and box connectors is therefore from 1,85 plus 2.3 = 4.15, or about 4, to 3.54 plus 7 = 10.54 or about 10.

Although body blank 50 has been described as made from an old drill collar, it could of course be machined from new stock having an outer diameter equal to that of the protectors 41. If the protectors are omitted or made of smaller outer diameter and if a welding technique adapted to make a satisfactory weld with thinner material at the ends of the body where it joins the connectors is adopted, the new stock could have a smaller outer diameter. However, the outer surface 65 of the body of the intermediate stem will always be a machined surface, i.e. turned in a lathe or milling machine, unless the integral protectors 41 are entirely omitted and the ends 42 omitted or formed by forging upsets on the ends of a bar or tube, in which latter case the surface 65 could be a mill surface, i. e. extruded or rolled. A machined outer surface 65 is therefore a distinguishing characteristic of the preferred embodiment of the invention.

FIG. 5 specifies an AISI 4145H alloy steel for the connector blanks. This is the same type steel as for the body blank 50 in the usual case where the body is made from a worn out drill collar. Alloy steel may be defined with reference to the AISI standards as comprising the AISI 1300 to 9900 range steels as distinct from the carbon steels in the AISI 1000 to 1200 range. See Mark's Mechanical Engineers Handbook, Sixth Edition, pages 6-32 through 35 for a list of the compositions of the AISI standard steels. Although the body 50 of the intermediate stem could be made of carbon steel, e.g. in the case of new material, alloy steel is preferred because of its greater strength since the intermediate stem is run in compression. An alloy steel body is therefore a characteristic of the preferred embodiment of the invention. Preferably the yield strength is at least 120,000 psi.

Referring now to FIG. 6, there is shown the method of welding the connector blanks to the body blank 50. The procedure is the same for both the pin and box connector blanks so the procedure at only one end will be described. The pin connector blank 51 is aligned concentrically with body blank 50 by means of a generally exteriorly cylindrical support 70, which may be tubular or solid. The exterior of the support has an annular groove 71 which is positioned under the gap between the end of body blank 50 and the end of connector blank 51. The assembly is preheated, e.g. in a furnace, and then the gap is filled with weld metal from a welding rod heated electrically or with a torch. As shown at 72 the weld metal is built up beyond the outer periphery of the connector and also overlapping the outer periphery of the end 42 as shown at 73. The end assembly comprising connector and transition portion is then heated to relieve stresses resulting from welding. The outer periphery of the connector, weld, and end are then machined down to the dotted line level 76, removing around one-sixteenth inch to one-eighth inch depth of metal from the exterior of the connector, forming an 18 degree taper elevator shoulder 77, and removing about one-eighth inch to three-sixteenths inch depth of metal from the outer surface of end 42 forming transition portion 78. By this process the adversely heat affected metal at the surface of the connector and transition portion and weld are removed. The support 70 is then bored out to the same inner diameter as the inner periphery 79, of the connector, the bore extending past the built up weld metal 62 inside the transition portion and the bevel 63 at its juncture with the inner periphery 80 of the main body 50. Finally, the connector threads are machined.

As shown in FIG. 6, the outer diameter of the transition portions 78 is intermediate between the outer diameters of the main portion of the body 50' or body blank 50 and residual portions 42' of the original ends 42 of the body blank.

Hard facing may be applied to the pin and box connectors and the protectors, or any of them, if desired.

Referring now to FIG. 7 there is shown the finished intermediate drill stem including main body 50' of alloy steel having one or more integral protectors 41 spaced apart along its length, transition portions 78 at the ends of the body and finished box and pin connectors 51', 52' of alloy steel rod welded thereto by welds 90, 91, with elevator shoulders 77 adjacent to and including the welds.

As noted in the preceding paragraph, more than one protector may be employed on a single length of intermediate stem. FIG. 2A illustrates such a construction using two protectors 21. Otherwise, the construction shown in FIG. 2A is the same as that of FIG. 2, previously described.

It is to be noted that although the body of the intermediate stem is of smaller outer diameter than the worn drill collar from which it is made, it still has a thick wall compared to drill collar. For example, the wall thickness may be three-fourths inch to twenty-seven thirtieths inch for 4½ inch O.D. intermediate stem and seven-eighths inch to thirty-five thirty-secondths inch for 5 inch O.D. intermediate stem, which is considerably thicker than that of drill pipe which ranges from about one-fourth inch to one-half inch. See pages 682 and 717 of the 6th edition of the Rotary Drilling Handbook, edited by J. E. Brantly, published in 1961 by Parmer Publications, for the wall thickness of various sizes of API standard drill pipe and drill collars. A wall thickness of about five-eighths inch may be considered as the demarcation line between thick drill pipe and thin intermediate stem.

However, the body wall thickness is much less than that of the connectors which have the same wall thickness as standard drill collars. Therefore even though the combined rigidity of the connectors is only a fraction, e.g. 60 percent of that of the unthreaded portions thereof, even when fully made up with the unthreaded pin root and box mouth (about 1 inch long) in tension and compression, the rigidity of the connector is still in excess of the rigidity of the main body of the intermediate stem.

That the foregoing is true will be apparent from consideration of a specific example. Assume a balanced connection, as is preferable, wherein any flexure which takes place is evenly divided between the pin and box. To this end, for usual tapers (1.5 inch to 3 inches per foot) and usual lengths of threaded portions (2 inch to 4.5 inch), the polar section modulus (I/C where I is the polar moment inertia and C is the distance to the fibre carrying the greatest stress) of the box at the root of the thread three-eighths inch toward the box mouth from the end of the pin when made up therein (hereinafter called the box bottom) should be 2¼ to 3¼ proferably 2½ times the polar section modulus of the pin at the root of the thread three-fourths inch from the pin shoulder (hereinafter called the pin base). When such connections are properly made up, e.g. according to the make up torque specifications given in the Hughes Tool Company Section of the 1966–67 Composite Catalogue of Oil Field Equipment and Services at page 2558 for tool joints and on page 48 of the 1963 edition of Rotary Shouldered Connections, published by Drilco Oil Tools, Inc., relative to drill collars, the intermediate stem being made up the same as for tool joints, the box mouth and pin shoulder will not separate under normal loading. The box bottom is therefore the most flexible part of the connection.

The following table gives the polar moment of inertia of the body and of the connector box bottom for balanced connections of various sizes of drill pipe, intermediate stem, and drill collars:

It will be seen from the foregoing table that the rigidity of the box bottom of the intermediate stem is considerably in excess of that of the body. It is a characteristic feature of intermediate drill stem in accordance with the preferred embodiment of the invention that the rigidity of the body be considerably less than that of the connectors, i.e. less than that of the connector box bottom with balanced connectors, so that flexure will take place primarily in the body rather than in the connectors, thereby prolonging the life of the connectors. This is a basic distinction from drill collars wherein the opposite holds true.

Preferably, the connector rigidity is at least twice that of the body of the intermediate stem. This means that it is desired that the polar moment of inertia of the box bottom of each connector box be at least twice the polar moment of inertia of the body of the intermediate drill stem. Since the polar moment of inertia is roughly directly proportional to the fourth power of the outer diameter, the connectors should have an outer diameter of about $(2)^{1/4}$ or 1.2 times the diameter of the main body of the stem. For example, with a 5 inches outer diameter for the main body of the stem, the connectors should have an outer diameter of at least 6 inches.

Since flexure takes place primarily in the body of the intermediate stem of the invention the thick walled alloy steel body with integral protectors is most advantageous to prevent wear due to rubbing on the side of the well wall. In this regard it should be noted that to provide long wear, prevent cutting into the well wall, and to reduce canting, the protectors should have a length of at least about twice the outer diameter of the protectors and should have tapered ends as shown at 92, 93 in FIG. 7.

The protectors of the present invention are to be distinguished from so-called drill pipe protectors used to prevent wear when drill pipe is run inside casing. The latter are usually made of rubber. The protectors of the present invention are made of metal and preferably have a hardness of at least 250 Brinell, e.g. 277–331 Brinell. They are machined integral with the body of the intermediate stem which distinguishes them from various subsequently applied types of metal drill pipe protectors. The hardness of the body of the stem is preferably that of conventional drill collars, e.g. about 250 Brinell, preferably 277–331 Brinnell.

In order to be effective in keeping the main portion of the body of the intermediate stem out of contact with the well wall, the outer diameter of the protectors should be as large as possible compatible with other drilling requirements such as fluid flow between protector and well wall. An outer diameter equal to that of the maximum outer diameter portion of the connectors would be preferable. However, since the protector is to be integral with the body and the body formed by machining down a tube of metal whose outer diameter from end to end is initially the same as that of the protector, economy in material costs and machining time suggests that the protectors have a somewhat smaller

| I=POLAR MOMENT OF INERTIA=0.049 (D⁴−d⁴) | | | | | | |
|---|---|---|---|---|---|---|
| | Drill pipe | | Intermediate stem | | Drill collars | |
| Body O.D. (in.) | 4¼ | 5 | 4½ | 5 | 6 | 6¾ |
| Connector O.D. (in.) | 6 | 6⅝ | 6 | 6¾ | 6 | 6¾ |
| Body I.D. (in.) | 3.825 | 4.275 | 2¹³⁄₁₆ to 3 | | 2¹³⁄₁₆ to 3 | 2¾ | 2¾ |
| Body I_B | 9.75 | 14.35 | 17.1 | 16.1 | 27.6 | 25.9 | 60.7 | 76.7 |
| Connector style | 4½″XH | 5″XH | 4″IF(=4½″ XH) | 4½″IF(=5″ XH) | 4½ PH | 4″ IF |
| Connector Ic at box bottom | 54.4 | 58 | 54.4 | 58 | 51.5 | 64.5 |
| Ratio Ic/I_B | 5.6 | 4.05 | 3.18 | 3.38 | 2.10 | 2.24 | 0.85 | 0.84 | outer diameter than the connectors if the body is made of new material. If the body is made of a worn out drill collar, the protector outer diameter may be that of the worn out collar. Since a collar usually becomes worn out by the connector box outer diameter wearing down so far that the box wall becomes too thin, a fairly definite minimum outer diameter for the protector is established in this case. This turns out to be one-half inch larger than the diameter of the main portion of the body of the stem, which provides a one-fourth inch standoff distance between the main portion of the body of the stem and the well wall. The diameter of the protector preferably is initially at least one-half inch larger than that of the main portion of the body of the stem and may range up to as large as the diameter of the maximum outer diameter portion of the connectors. Whatever the initial diameter, as the intermediate stem is used the outer diameters of the protectors and connectors will become smaller.

The preferred minimum psacing between centralizers (connectors and/or protectors) is about 15 feet, to prevent body contact with well wall. It is to be observed that if the standoff distance of the protectors, i.e. difference between protector outer radius and that of the main portion of the body, is large, the spacing of the protectors along the length of the intermediate stem may be increased.

The connector hardness (e.g. above 250 Brinell, preferably 277 to 331 Brinell), thread form, shoulder height, and distance from shoulder to threads (e.g. one inch) is preferably that of conventional rotary shouldered connectors for tool joints and drill collars.

Although the intermediate stem has been described as made by welding connectors to a body formed from either a worn drill collar or from new pipe, the connectors could also be formed integral with the body, e.g. from all new stock or by using the connectors of the worn drill collar. In the latter connection it is to be noted that a connector too worn to be suitable for drill collars may yet be satisfactory for intermediate stem since the make up torque need not be as high and since the flexure will take place primarily in the body of the intermediate stem rather than in the connection.

While a preferred embodiment of the invention has been shown and described and several modifications thereof described, many other modifications can be made by one skilled in the art without departing from the spirit of the invention.

We claim:

1. An intermediate drill stem comprising
an elongated, tubular, steel body the main portion of which has a substantially uniform outer diameter,
said body having a wall thickness of at least about five-eighths inch in the main portion thereof.
a tubular alloy steel connector connected to each end of said body,
one of said connectors being interiorly threaded at its end opposite from its end that is connected to said body, said interiorly threaded end providing a box at one extremity of the stem,
the other of said connectors having a portion of reduced outer diameter at its end opposite from its end that is connected to said body, said portion of reduced outer diameter being threaded to provide a pin at the other extremity of the stem,
the maximum outer diameter portion of each of said connectors being at least 1.2 times that of said main portion of the body whereby the rigidity of a connection comprising such pin and box connectors can be twice that of the main portion of the body of the stem,
said intermediate stem being distinguished by the length of the maximum diameter portion of the pin connector being in the range of nearly twice to about seven times the outer diameter of the connector,
the combined length of the maximum diameter portions of the pin and box connectors being in the range of four to ten times the outer diameter of said maximum diameter portions,
the body of the stem being made of alloy steel having a yield strength of at least about 120,000 psi,
the outer surface of said body being a machined surface,
said body having ends of larger outer diameter than that of said main portion of the body but of somewhat smaller outer diameter than that of the maximum diameter portion of the connectors,
each connector being rod welded to one of said ends with the weld metal overlapping the end to build up the maximum outer diameter of the end to equal that of the connector, and
a tapered elevator shoulder at each end of the body extending into said build up of weld metal.

2. Subject matter of claim 1 further distinguished by:
the inner diameters of said connectors being equal to each other and slightly smaller than that of the main portion of said body,
the inner diameter of said body being uniform througout except at the ends where the body is built up with weld metal on the inside to make the ends have the same inner diameter as the connectors adjacent the welds.

3. Subject matter of claim 2 further distinguished by:
said body having a transition portion between each end and the main body portion,
said transition portions each having an outer diameter smaller than that of said ends and larger than that of said main portion of the body.

4. Subject matter of claim 3 further distinguished by:
said body having at least one portion located between and spaced from the ends of the body which one portion has a larger outer diameter than said main portion of the body,
said portion of larger outer diameter being formed integral with said main portion of the body and providing a protector against wear on the main portion of the body.

5. An intermediate drill stem comprising
an elongated, tubular, steel body the main portion of which has a substantially uniform outer diameter,
said body having a wall thickness of at least about five-eighths inch in the main portion thereof,
a tubular alloy steel connector connected to each end of said body,
one of said connectors being interiorly threaded at its end opposite from its end that is connected to said body, said interiorly threaded end providing a box at one extremity of the stem,
the other of said connectors having a portion of reduced outer diameter at its end opposite from its end that is connected to said body, said portion of reduced outer diameter being threaded to provide a pin at the other extremity of the stem, the maximum outer diameter portion of each of said connectors being at least 1.2 times that of said main portion of the body whereby the rigidity of a connection comprising such pin and box connectors can be twice that of the main portion of the body of the stem, said intermediate stem being distinguished by the length of the maximum diameter portion of the pin connector being in the range of nearly twice to about seven times the outer diameter of the connector, the combined length of the maximum diameter portions of the pin and box connectors being in the range of four to ten times the outer diameter of said maximum diameter portions, the body of the stem being made of alloy steel having a yield strength of at least about 120,000 psi, the outer surface of said body being a machined surface, said body having ends of larger outer diameter than that of said main portion of the body but of somewhat smaller outer diameter than that of the maximum diameter portion of the connectors, each connector being rod welded to one of said ends with the weld metal overlapping the end to build up the maximum outer diameter of the end to equal that of the connector, a tapered elevator shoulder at each end of the body extending into said build up of weld metal, the inner diameters of said connectors being equal to each other and slightly smaller than that of the main portion of said body, the inner diameter of said body being uniform throughout except at the ends where the body is built up with weld metal of the inside to make the ends have the same inner diameter as the connectors adjacent the welds, said body having a plurality of protectors located between and spaced from the ends of the body each of which protectors has a larger outer diameter than said main portion of the body, said protectors being formed integral with said main portion of the body and providing protection against wear on the main portion of the body, said protectors each having an outer diameter at least one-half inch larger than the outer diameter of the main portion of the body of the stem, the ends of said protectors being tapered where they join the main portion of the body, the length of each protector being at least twice the outer diameter of the connectors.

6. An intermediate drill stem comprising an elongated, tubular, steel body the main portion of which has a substantially uniform outer diameter, said body having at least one portion located between and spaced from the ends of the body which one portion has a larger outer diameter than said main portion of the body, said portion of larger outer diameter being formed integral with said main portion of the body and providing a protector against wear on the main portion of the body, the ends of said protector being tapered where they join the main portion of the body, said body having a wall thickness of at least five-eighths inch in the main portion thereof.

said body having ends of larger outer diameter than the main portion of the body, the outer diameter of said ends being substantially as large as that of said protector, a tubular steel connector rod-welded to each end of said body, said connectors each having a larger outer diameter than the end of the body to which it is welded, the weld metal overlapping the end to build up its outer diameter to that of the connector.

7. An intermediate drill stem comprising an elongated, tubular, steel body the main portion of which has a substantially uniform outer diameter, said body having a wall thickness of at least five-eighths inch in the main portion thereof, said body having at least one protector located between and spaced from the ends of the body, said protector having a larger outer diameter than said main portion of the body, said protector being formed integral with said main portion of the body, said body having ends of larger outer diameter than the main portion of the body, the outer diameter of said ends being substantially as large as that of said protector, a tubular steel connector rod welded to each end of said body, said connectors each having a larger outer diameter than the end of the body to which it is welded, the weld metal overlapping the end to build up its outer diameter to that of the connector, a tapered elevator shoulder at each end of the body extending into said build up of weld metal thereon.

8. Subject matter of claim 7 further distinguished by:

the inner diameters of said connectors being equal to each other and slightly smaller than that of the main portion of said body, the inner diameter of said body being uniform throughout except at the ends where the body is built up with weld metal on the inside to make the ends have the same inner diameter as the connectors adjacent the welds.

9. Subject matter of claim 7 further distinguished by:

the maximum outer diameter portion of each of said connectors being at least 1.2 times that of said main portion of the body whereby the rigidity of a connection comprising such pin and box connectors may be twice that of the main portion of the body of the stem, said body having a transition portion between each end and the main body portion, said transition portions each having an outer diameter smaller than that of said ends and larger than that of said main portion of the body.

10. Subject matter of claim 7 further distinguished by:

the length of the box connector being at least of the order of twice the outer diameter of the connector, the length of the maximum diameter portion of the pin connector being in the range of nearly twice to aboue seven times the outer diameter of the connector.

11. An intermediate drill stem comprising an elongated, tubular, alloy steel body the main portion of which has a substantially uniform outer diameter, the exterior surface of said main portion being a machined surface, said body having at least one portion located between and spaced from the ends of the body which one portion has a larger outer diameter than said main portion of the body, said portion of larger outer diameter being formed integral with said main portion of the body and providing a protector against wear on the main portion of the body, the ends of said protector being tapered where they join the main portion of the body, said body having a wall thickness of at least five-eighths inch in the main portion thereof, said body having ends of larger outer diameter than the main portion of the body, the outer diameter of said ends being substantially as large as that of said protector, said body having a transition portion between each end and the main body portion, said transition portions each having an outer diameter smaller than that of said ends and larger than that of said main portion of the body, a tubular alloy steel connector rod welded to each end of said body, said connectors each having a larger outer diameter than the end of the body to which it is welded, the weld metal overlapping the end to build up its outer diameter to that of the connector, a tapered elevator shoulder at each end of the body extending into said build up of weld metal thereon, the inner diameters of said connectors being equal to each other and slightly smaller than that of the main portion of said body, the inner diameter of said body being uniform throughout except at the ends where the body is built up with weld metal on the inside to make the ends have the same inner diameter as the connectors adjacent the welds, one of said connectors being interiorly threaded at its end opposite from its welded end to provide a box at one extemity of the stem, the other of said connectors having a portion of reduced outer diameter at its end opposite from its welded end, said portion of reduced outer diameter being threaded to provide a pin at the other extemity of the stem, the maximum outer diameter portion of each of said connectors being at least 1.2 times that of said main portion of the body whereby the rigidity of a connection comprising such pin and box connectors cay be twice that of the main portion of the body of the stem, the length of the maximum diameter portion of the pin connector being in the range of nearly twice to about seven times the outer diameter of the connector.

the combined length of the maximum diameter portions of the pin and box connectors being in the range of four to ten times the outer diameter of said maximum diameter portions, the length of each protector being at least of the same order of magnitude as the outer diameter of the protector, each said protector having a diameter at least one-half inch larger than that of said main portion of the body, said connectors and each protector body providing centralizers for said intermediate stem, the longitudinal spacing between said centralizers being a maximum of 15 feet.

12. An intermediate drill stem comprising an elongated, tubular, steel body the main portion of which has a substantially uniform outer diameter, said body having a wall thickness of at least about five-eighths inch in the main portion thereof, a tubular alloy steel connector connected to each end of said body, one of said connectors being interiorly threaded at its end opposite from its end that is connected to said body, said interiorly threaded end providing a box at one extremity of the stem, the other of said connectors having a portion of reduced outer diameter at its end opposite from its end that is connected to said body, said portion of reduced outer diameter being threaded to provide a pin at the other extremity of the stem, the maximum outer diameter portion of each of said connectors being at least 1.2 times that of said main portion of the body whereby the rigidity of a connection comprising such pin and box connectors can be twice that of the main portion of the body of the stem, said connectors being long axially compared to the diameter thereof, the combined length of the maximum diameter portions of the pin and box connectors being at least four times the outer diameter of said maximum diameter portions, the outer surface of said main portion of said body being a turned machined surface, said body having ends of larger outer diameter than that of said main portion of the body, each connector being welded to one of said ends, said body having at least one portion located between and spaced from the ends of the body which one portion has a larger outer diameter than said main portion of the body, said portion of larger outer diameter providing a protector against wear on the main portion of the body, each said protector being homogeneously integral with said main portion of the body, said protector and main portion being one and the same single piece of metal, each said protector having an outer diameter at least one-half inch larger than the outer diameter of the main portion of the body of the stem, the length of each protector being at least twice the outer diameter of the connectors, said long connectors and each said protector being spaced apart along the length of the stem and serving as centralizers for said intermediate stem.

13. Subject matter of claim 12, further distinguished by:

said body having a transition portion between each end and the main body portion, said transition portions each having an outer diameter smaller than that of said ends and larger than that of said main portion of the body.

14. Subject matter of claim 12 further distinguished by:

the outer diameter of said ends of the body being substantially as large as that of said protector, said connectors each having a larger outer diameter than the end of the body to which it is welded, the weld metal overlapping the end to build up its outer diameter to that of the connector.

15. Subject matter of claim 14 further distinguished by:

said body having a transition portion between each end and the main body portion, said transition portions each having an outer diameter smaller than that of said ends and larger than that of said main portion of the body.

16. Subject matter of claim 14 further distringuished by:

said stem having an elevator shoulder at each end of the body at the juncture of said end and the weld, each shoulder including a portion of the metal of the weld and a portion of the metal of the end of the body.

17. Subject matter of claim 16 further distinguished by:

said body having a transition portion between each end and the main body portion, said transition portions each having an outer diameter smaller than that of said ends and larger than that of said main portion of the body.

18. Subject matter of claim 12 further distinguished by:

the ends of said protector being tapered where they join the main portion of the body, the longitudinal distance between the adjacent extremities of adjacent ones of said centralizers being not in excess of 15 feet.

19. Subject matter of claim 12, said connectors being free of hard facing thereabout, said protector being of smaller outer diameter than that of the maximum outer diameter portion of said connectors, said protector having a band of hard facing material set in an annular groove around said protector.

20. Subject matter of claim 12 wherein said intermediate stem has an inner diameter characteristic of a drill collar and an outer diameter characteristic of drill pipe.

21. An intermediate drill stem comprising an elongated, tubular, steel body the main portion of which has a substantially uniform outer diameter, said body having ends of larger outer diameter than that of the main portion thereof, a tubular alloy steel connector connected to each end of said body, one of said connectors being interiorly threaded at its end opposite from its end that is connected to said body, said interiorly threaded end providing a box at one extremity of the stem, the other of said connectors having a portion of reduced outer diameter at its end opposite from its end that is connected to said body, said portion of reduced outer diameter being threaded to provide a pin at the other extremity of the stem, the maximum outer diameter portion of each of said connectors being at least 1.2 times that of said main portion of the body whereby the rigidity of a connection comprising such pin and box connectors can be twice that of the main portion of the body of the stem, each of said connectors being connected to one of said ends of the body by added weld metal joining the connector to the end, each connector having a maximum outer diameter larger than the end of the body to which it is welded, the weld metal overlapping the end to such an extent as to build up its outer diameter to that of said maximum diameter of the connector.

22. Subject matter of claim 21 said stem having an elevator shoulder at each end of the body at the juncture of said end and the weld, each shoulder including a portion of the metal of the weld and a portion of the metal of the end of the body.

23. Combination of claim 1 including the hereinbefore set forth invention.

24. An intermediate drill stem comprising an elongated, tubular, alloy steel body the main portion of which has a substantially uniform outer diameter, said body having ends of larger outer diameter than that of the main portion thereof, said main portion having a wall thickness of at least about five-eighths inch, a tubular alloy steel connector connected to each end of said body, one of said connectors being interiorly threaded at its end opposite from its end that is connected to said body, said interiorly threaded end providing a box at one extremity of the stem, the other of said connectors having a portion of reduced outer diameter at its end opposite from its end that is connected to said body, said portion of reduced outer diameter being threaded to provide a pin at the other extremity of the stem, the maximum outer diameter portion of each of said connectors being at least 1.2 times that of said main portion of the body whereby the rigidity of a connection comprising such pin and box connectors can be twice that of the main portion of the body of the stem, said connectors being long axially compared to the diameter thereof, the combined length of the maximum diameter portions of the pin and box connectors being at least four times the outer diameter of said maximum diameter portions, the outer surface of said main portion of said body being a turned machined surface, said body having ends of larger outer diameter than that of said main portion of the body, each connector being homogeneously integral with one of said ends of the body, each said connector and body being made of one and the same piece of metal, said body having at least one portion located between and spaced from the ends of the body which one portion has a larger outer diameter than said main portion of the body, said portion of larger outer diameter providing a protector against wear on the main portion of the body, each said protector being homogeneously integral with said main portion of the body, said protector and main portion being one and the same single piece of metal, each said protector each having an outer diameter at least one-half inch larger than the outer diameter of the main portion of the body of the stem, the length of each protector being at least twice the outer diameter of the connectors, said long connectors and each said protector being spaced apart along the length of the stem and serving as centralizers for said intermediate stem.

25. Subject matter of claim 12, said body being made of steel in the A.I.S.I. 1100 to 1,200 series.

* * * * *

Disclaimer 3,784,238.—*Glenn G. Change* and *Sam T. Crews*, Houston, and *Clenis E. Wilson*, Spring, Tex. INTERMEDIATE DRILL STEM. Patent dated Jan. 8, 1974. Disclaimer filed Nov. 30, 1973, by the assignee, *Smith International, Inc.*

Hereby disclaims the portion of the term of the patent subsequent to Nov. 20, 1990.

[*Official Gazette June 25, 1974.*]

PO-1050
(5/69)

UNITED STATES PATENT OFFICE
CERTIFICATE OF CORRECTION

Patent No. 3,784,238      Dated JANUARY 8, 1974

Inventor(s) GLENN G. CHANCE, SAM T. CREWS, and CLENIS E. WILSON

It is certified that error appears in the above-identified patent and that said Letters Patent are hereby corrected as shown below:

IN THE INTRODUCTION

Item [21], on the line following the line

"[21] Appl. No. 143,953", insert:

-- Related U. S. Application Data

[63] This application is a division of prior copending application, Serial No. 825,109 filed May 1, 1969, now abandoned, which was copending with and a continuation-in-part of our prior application Serial No. 669,138 filed September 20, 1967, now abandoned, of which the present application is a continuation. Our pending application Serial No. 165,810 filed June 24, 1971, is a continuation of Serial No. 825,109. --.

IN THE SPECIFICATION

Column 1, Line 2, insert:

-- CROSS-REFERENCE TO RELATED APPLICATION

This application is a division of prior copending application, Serial No. 825,109 filed May 1, 1969, now abandoned, which was copending with and a continuation-in-part of our prior application Serial No. 669,138 filed September 20, 1967, now abandoned, of which the present application is a continuation. Our pending application Serial No. 165,810 filed June 24, 1971, is a continuation of Serial No. 825,109. --.

PO-1050
(5/69)

UNITED STATES PATENT OFFICE
CERTIFICATE OF CORRECTION

Patent No. 3,784,238            Dated    January eighth, 1974

Inventor(s)   GLENN G. CHANCE, SAM T. CREWS AND CLENIS E. WILSON

It is certified that error appears in the above-identified patent and that said Letters Patent are hereby corrected as shown below:

On the cover sheet [73] "Smith International, Inc. Midland, Pa." should read --Smith International, Inc., Midland, Texas--.

Signed and sealed this 19th day of November 1974.

(SEAL)
Attest:

McCOY M. GIBSON JR.            C. MARSHALL DANN
Attesting Officer               Commissioner of Patents